US012282928B2

United States Patent
Lee et al.

(10) Patent No.: US 12,282,928 B2
(45) Date of Patent: Apr. 22, 2025

(54) METHOD AND APPARATUS FOR ANALYZING SALES CONVERSATION BASED ON VOICE RECOGNITION

(71) Applicant: VODABI Co., Ltd., Seoul (KR)

(72) Inventors: Jin Kook Lee, Seoul (KR); Se Myung Baek, Seoul (KR); Dae Young Hong, Seoul (KR); Jeong Woo Seo, Seoul (KR)

(73) Assignee: VODABI Co., Ltd., Seoul (KR)

( * ) Notice: Subject to any disclaimer, the term of this patent is extended or adjusted under 35 U.S.C. 154(b) by 368 days.

(21) Appl. No.: 17/575,653

(22) Filed: Jan. 14, 2022

(65) Prior Publication Data

US 2022/0138770 A1    May 5, 2022

Related U.S. Application Data

(63) Continuation of application No. PCT/KR2020/009310, filed on Jul. 15, 2020.

(30) Foreign Application Priority Data

Jul. 16, 2019 (KR) .................. 10-2019-0086037

(51) Int. Cl.
G06Q 30/02 (2023.01)
G10L 15/26 (2006.01)

(52) U.S. Cl.
CPC .............. *G06Q 30/02* (2013.01); *G10L 15/26* (2013.01)

(58) Field of Classification Search
CPC ........................................... G06Q 10/00–90/00
See application file for complete search history.

(56) References Cited

U.S. PATENT DOCUMENTS

| | | | |
|---|---|---|---|
| 7,676,400 B1* | 3/2010 | Dillon | G06Q 30/02 705/26.7 |
| 10,891,676 B1* | 1/2021 | Kan | G06Q 30/0643 |
| 2007/0189520 A1* | 8/2007 | Altberg | G06Q 30/06 380/30 |
| 2014/0046792 A1* | 2/2014 | Ganesan | G06Q 30/0611 705/26.4 |
| 2015/0095188 A1* | 4/2015 | Lee | G06Q 30/0633 705/26.8 |
| 2019/0080370 A1* | 3/2019 | Copeland | H04M 3/5133 |

FOREIGN PATENT DOCUMENTS

| | | |
|---|---|---|
| JP | 2002024704 A | 1/2002 |
| KR | 1020150141279 A | 12/2015 |
| KR | 101623052 B1 | 5/2016 |
| KR | 1020160059294 A | 5/2016 |
| KR | 1020180017342 A | 2/2018 |

* cited by examiner

*Primary Examiner* — Arif Ullah
(74) *Attorney, Agent, or Firm* — Novick, Kim & Lee, PLLC; Jae Youn Kim

(57) ABSTRACT

There is disclosed a method for analyzing a sales conversation based on voice recognition. The disclosed method comprises obtaining voice information about a sales conversation between a sales representative and a customer, converting the voice information into text, extracting at least one of a keyword and a sentence corresponding to each of a plurality of business items from the text, extracting analysis information for each of the plurality of business items based on at least one of the keyword and the sentence, and calculating an evaluation score for each of the plurality of business items based on the analysis information for each of the plurality of business items.

13 Claims, 17 Drawing Sheets

FIG. 7A

| No. | Speaker | Recognized sentence | Categorization | Tag | Keyword | Emotional change | Analysis information |
|---|---|---|---|---|---|---|---|
| 1 | Representative | Are you youngbi bank duputy manager hong gil-dong, right? | Question | A (authority) | Deputy manager | | Authority, deputy manager |
| 2 | Customer | Yes, that's right. | Answer | A (authority) | | 0 | |
| 3 | Representative | Are you currently using an in-house cloud service? | Question | N(needs) | Current, cloud service | | |
| 4 | Customer | Yes, i am using. | Answer | N(needs) | Used | 0 | Introduction status, service used |
| 5 | Customer | However, there are some issues within the company, so i'm looking into it here and there. | Answer | N(needs) | In-house, issue, looking into | -1 | Introduction status, under consideration |
| 6 | Representative | Yes, so do you have any plans to introduce a new cloud? | Question | N(needs) | New, introduce, plan | | |
| 7 | Customer | Yes, i'm interested in your mentions a little bit. | Answer | N(needs) | Interested | 0 | Introduction status, under consideration |
| 8 | Representative | Is the cloud under review the one on the AWS side? | Question | N(needs) | AWS | | |
| 9 | Customer | The specifics have not been decided yet, so we are looking into it. | Answer | N(needs) | Decide, not decided, yet | -1 | Consideration_AWS _undecided |
| 10 | Customer | I have to be carefull about security management, so i'm looking into this and that. | Answer | N(needs) | Security | 0 | Consideration security |
| 11 | Representative | Yes, would you like to receive consulting on the introduction of such a new cloud? | Question | N(needs) | | | |
| 12 | Customer | Well. | Answer | | Well | -2 | |
| 13 | Customer | Well, i have to test it and see the possibility. | Answer | N(needs) | Test | 0 | Consideration_test to be done or not |

FIG. 7B

| No. | Speaker | Recognized sentence | Categorization | Tag | Keyword | Emotional change | Analysis information |
|---|---|---|---|---|---|---|---|
| 14 | Customer | Moving all the data at once is burdensome, so you should start with the testing phase. | Answer | N(needs) | Burdensome, test | 0 | Consideration_test to be done or not |
| 15 | Customer | In fact, i was looking for other companies as well. | | C Competitor | Other company | 0 | Competitor_exists |
| 16 | Customer | It was a bit burdensome because the contract period was so long. | | N(needs) | Contract period, long, burdensome | 0 | Consideration_short contract period |
| 17 | Representative | Our text version contract is also available, the text version can be contracted for short. | | | | | |
| 18 | Customer | Oh, really? | | | | 3 | |
| 19 | Customer | Oh, can you give me some service guide? | Question | N(needs) | Guide | 0 | Intent on consulting |
| 20 | Customer | I think you can give me some information by e-mail or something like this. | | N(needs) | Mail information | 0 | Follow-up work_mail transmission |
| 21 | Representative | Yes sir, what do you think about when the service will be introduced? | Question | T(purchase time) | | | Introduction schedule_as soon as possible |
| 22 | Customer | We like the faster the better. | Answer | T(purchase time) | Faster | 1 | |
| 23 | Representative | Yes, what do you think about the cost? | Question | B(budget) | | | |
| 24 | Customer | That's a matter that needs to be approved by the manager, so i can't say for sure. | Answer | B(budget), A(authority) | Manager, approval | -1 | Budget_unconfirmed budget authority_manager |
| 25 | Representative | Yes, i will send the related materials by e-mail first. | Question | | Mail, meterial, sending | | Follow-up_mail transmission |
| 26 | Customer | Yes, thank you. | Answer | | | 3 | |

FIG. 11

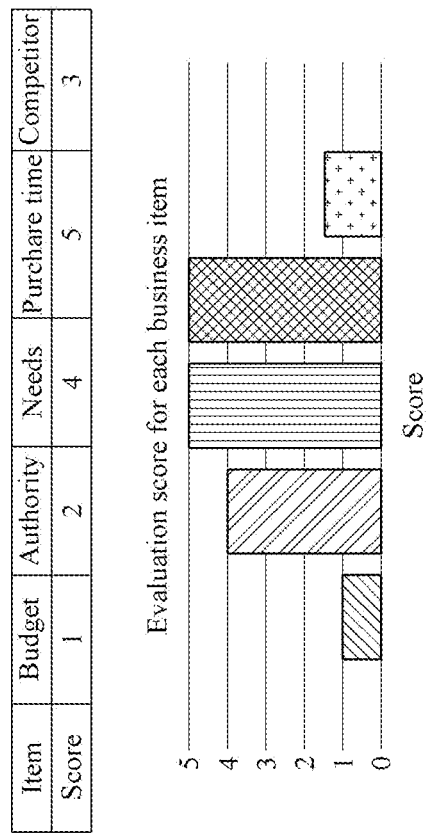

| Item | Budget | Authority | Needs | Purchase time | Competitor |
|---|---|---|---|---|---|
| Score | 1 | 2 | 4 | 5 | 3 |

Evaluation score for each business item

▨ Budget ▧ Authority ▥ Needs ▨ Purchase time ☐ Competitor

Reference table

| Identification No. | Budget | Authority | Needs | Purchase time | Competitor | Number of samples | Reliability | Probability of success |
|---|---|---|---|---|---|---|---|---|
| 1 | 1 | 2 | 3 | 4 | 5 | 20 | 0.89 | 0.24 |
| ⋮ | | | | | | | | |
| 8 | 1 | 2 | 4 | 5 | 3 | 2 | 0.12 | 0.78 |
| 9 | 5 | 2 | 3 | 4 | 1 | 24 | 0.9 | 0.81 |
| ⋮ | | | | | | | | |
| 15 | 2 | 3 | 4 | 5 | 3 | 31 | 0.91 | 0.91 |
| 16 | 2 | 1 | 4 | 5 | 3 | 22 | 0.9 | 0.54 |
| 17 | 3 | 2 | 4 | 5 | 2 | 49 | 0.94 | 0.95 |

→ DEVIATION SUM:0 (row 8)

→ DEVIATION SUM:2 (row 15)
→ DEVIATION SUM:2 (row 16)
→ DEVIATION SUM:3 (row 17)

METHOD AND APPARATUS FOR ANALYZING SALES CONVERSATION BASED ON VOICE RECOGNITION

CROSS-REFERENCE TO RELATED APPLICATION

This application is a US Bypass Continuation Application of International Application No. PCT/KR2020/009310, filed on Jul. 15, 2020, and designating the United States, the International Application claiming a priority date of Jul. 16, 2019, based on prior Korean Application No. 10-2019-0086037, filed on Jul. 16, 2019, the disclosure of which is incorporated herein by reference in its entirety.

BACKGROUND

Technical Field

The present invention relates to a method and apparatus for analyzing a sales conversation based on voice recognition.

Background Art

In the stage of enticing people to purchase goods or services to be sold, telephone consultations or in-person consultations are used. Sales representatives may have conversations about sales with customers through phone calls or visits, and build a sales strategy based on the conversations.

In recent years, business models have been diversified. As business-to-business (B2B) business models as well as business-to-customer (B2C) business models are active, the aspects of the sales conversation are becoming increasingly diverse and complex. Especially in sales where the business-to-business business model is applied, there may be many factors to consider in the sales conversation.

From the point of view of a business operator that supplies products or services, a clear and efficient analysis of sales conversations determines the success or failure of sales. However, as the number of factors to be considered in the sales conversation increases as described above, there may be information that the sales representative has missed or has not recognized in the conversation. Even if there is a voice file for the sales conversation, there is a problem that, for a person to directly analyze the voice file, a lot of human resources are consumed and the accuracy of the analysis is also lowered.

With the recent development of artificial intelligence and natural language understanding, a technology for converting a user's voice into text has been presented. However, it is difficult to expect high-quality analysis results for sales conversations only with simple voice-to-text conversion technology. In this situation, an analysis platform for sales conversation is required.

SUMMARY OF THE INVENTION

Technical Problem

According to at least one embodiment, there are disclosed a sales conversation analysis method and apparatus for analyzing a sales conversation based on voice recognition and providing information on possibility of sales success. According to at least one embodiment, there are disclosed a sales conversation analysis method and apparatus capable of increasing the probability of sales success by analyzing a sales conversation based on voice recognition and providing a recommendation query to a sales representative.

Technical Solution

According to one aspect, a method for analyzing a sales conversation based on voice recognition is disclosed. The disclosed method comprises obtaining voice information about a sales conversation between a sales representative and a customer; converting the voice information into text; extracting at least one of a keyword and a sentence corresponding to each of a plurality of business items from the text; extracting analysis information for each of the plurality of business items based on at least one of the keyword and the sentence; and calculating an evaluation score for each of the plurality of business items based on the analysis information for each of the plurality of business items.

The method may further comprise calculating a probability of sales success based on the evaluation score for each of the plurality of business items.

The probability of sales success may be calculated based on a distribution indicated by the evaluation score for each of the plurality of business items.

At least one reference distribution identical to or similar to the distribution indicated by the evaluation score for each of the plurality of business items may be extracted from a reference table stored in advance, and the probability of sales success may be calculated based on data corresponding to the reference distribution.

The probability of sales success may be calculated based on a deviation between the distribution indicated by the evaluation score and the reference distribution, the number of samples corresponding to the reference distribution, and a success probability value corresponding to the reference distribution.

The method may comprise generating a recommendation query for at least one business item based on at least one of analysis information for each of the plurality of business items and the evaluation score for each of the plurality of business items.

At least one business item with an evaluation score smaller than a reference score may be selected from among the plurality of business items, a reference sentence identical to or similar to the sentence that is extracted from the text in relation to the selected business item may be extracted from a reference database (DB), and the recommendation query may be generated based on a query list corresponding to the reference text.

The plurality of business items may include items about a budget of a customer, an authority of the customer, needs of the customer, a purchase time of the customer, and a competitor of a sales entity.

First information about the budget of the customer, second information about the authority of the customer, third information about the needs of the customer, fourth information about the purchase time of the customer, and fifth information about the competitor of the sales entity may be extracted, and a first score for the budget of the customer may be calculated based on the first information, a second score for the authority of the customer may be calculated based on the second information, a third score for the needs of the customer may be calculated based on the third information, a fourth score for the purchase time of the customer may be calculated based on the fourth information, and a fifth score for the competitor of the sales entity may be calculated based on the fifth information.

The method may further comprise calculating the probability of sales success based on distribution indicated by the first to fifth scores.

At least one business item corresponding to a score smaller than the reference score may be selected from among the first to fifth scores, a reference sentence identical to or similar to the sentence that is extracted from the text in relation to the selected business item may be extracted from a reference database (DB), and the recommendation query may be generated based on a query list corresponding to the reference text.

The plurality of business items may further include an item for a customer question, sixth information for the customer question may be extracted and a sixth score for the customer question may be calculated based on the sixth information, and the sixth information may include information about the number of customer questions.

The sixth information may include information about a pending customer question, and The method may further comprise generating schedule information for the sales representative based on alarm information for the pending customer question.

The method may further comprise categorizing the customer question based on the plurality of business items, calculating an evaluation score for the customer question for each of the business items based on analysis of the categorized customer question, and correcting the evaluation score for each of the business items based on the evaluation score for the customer question.

BRIEF DESCRIPTION OF THE DRAWINGS

FIGS. 7A and 7B are conceptual diagrams illustrating that keywords, sentences, and analysis information are extracted for each business item from a conversation text.

FIG. 11 is a conceptual diagram showing a third embodiment of extracting a reference distribution and calculating a probability of sales success.

DETAILED DESCRIPTION

Advantages and features of the inventive concept, and methods for achieving the advantages and features will be clarified with reference to embodiments described in detail together with the accompanying drawings. However, it should be understood that the present invention is not limited to the embodiments presented below, but may be implemented in various different forms, and includes all transformations, equivalents, and substitutes that fall within the spirit and scope of the present invention. The embodiments presented below are provided so that the disclosure of the present invention is complete, and to fully inform those of ordinary skill in the art to which the present invention pertains to the scope of the invention. Furthermore, in the description of the present invention, if it is determined that the detailed description of the known technology related to the present disclosure may unnecessarily obscure the subject matter of the present invention, the detailed description thereof will be omitted.

The terms used in the present application are merely provided to describe specific embodiments, and are not intended to limit the present invention. The singular forms, "a", "an" and "the" are intended to include the plural forms as well, unless the context clearly indicates otherwise. In the present application, it will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that, although the terms first, second, etc. may be used herein to describe various elements, the elements should not be limited by these terms. These terms are only used to distinguish one element from another element.

Figure 1:
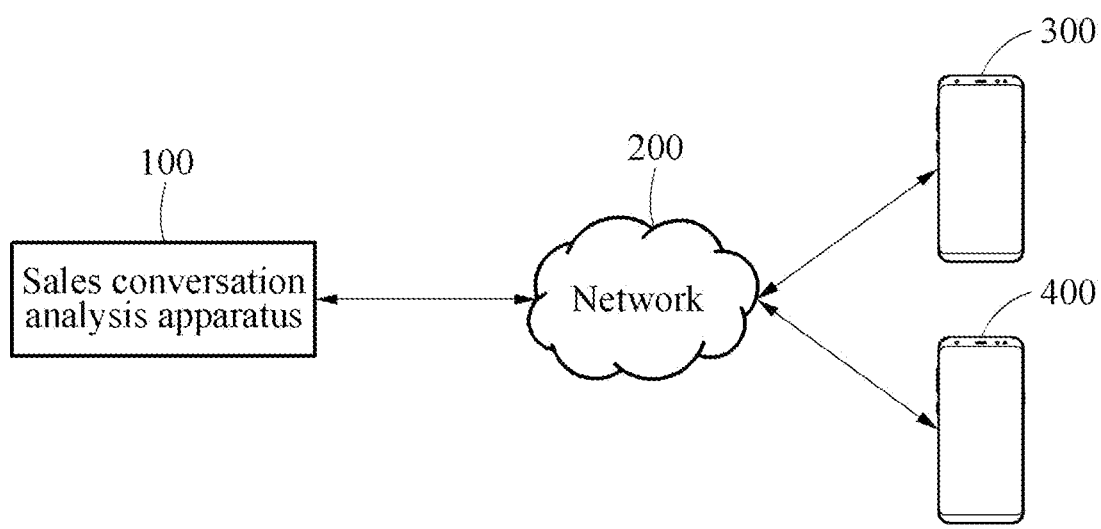
FIG. 1 is a conceptual diagram showing a first embodiment of a sales conversation analysis system.

FIG. 1 is a conceptual diagram showing a first embodiment of a sales conversation analysis system.

Referring to FIG. 1, the sales conversation analysis system may comprise an apparatus 100 for analyzing a sales conversation (sales conversation analysis apparatus), a sales representative terminal 300, and a customer terminal 400.

The sales conversation analysis apparatus 100 may communicate with at least one of the sales representative terminal 300 and the customer terminal 400 through a network 200. The sales conversation analysis apparatus 100 may be operated by a business operator that provides a sales conversation analysis service or a subject under the supervision of the business operator. For example, the sales conversation analysis apparatus 100 may be operated by a marketing company or a business connection service provider, but the embodiment is not limited thereto. The sales conversation analysis apparatus 100 may be a computing device capable of performing a predetermined calculation process and a communication process. By way of example, the sales conversation analysis apparatus 100 may achieve desired system performance by using a combination of typical computer hardware (for example, devices that may comprise computer processors, memory, storage, input and output devices, and other components of computing devices in the related art; electronic communication devices such as routers and switches, and electronic information storage systems such as network-attached storage (NAS) and storage area network (SAN)) and computer software (that is, instructions that causes the computing device to function in a particular way).

The sales conversation analysis apparatus 100 may perform at least a part of the sales conversation analysis service. As will be described later, the sales conversation analysis service may include text conversion of sales conversation voices, prediction of sales success based on the converted text, generation of the recommendation query, and the like.

The sales conversation analysis apparatus 100 may provide a user interface for providing the sales conversation analysis service to the sales representative terminal 300. The sales conversation analysis apparatus 100 may acquire voice information about the sales conversation from the sales representative terminal 300 through the network 200. The sales conversation analysis apparatus 100 may analyze voice information and provide the analysis result to the sales representative terminal 300.

The network 200 is a network connecting the sales conversation analysis apparatus 100 and the sales representative terminal 300 and includes a wired network, a wireless network, and the like. The network 200 may be a closed network such as a local area network (LAN), a wide area network (WAN), or an open network such as the Internet. The Internet refers to a worldwide open computer network structure that provides a TCP/IP protocol and several services existing in its higher layers, that is, hypertext transfer protocol (HTTP), Telnet, file transfer protocol (FTP), domain name system (DNS), simple mail transfer protocol (SMTP), simple network management protocol (SNMP), network file service (NFS), and network information service (NIS).

The sales representative terminal 300 may be a device of a user capable of accessing a network. The sales representative terminal 300 may comprise, but is not limited to, a smartphone, a tablet PC, a laptop, a desktop, and the like. The sales representative terminal 300 may display a user interface. The sales representative terminal 300 may transmit information on the user's interaction with the user interface to the sales conversation analysis apparatus 100. The sales representative terminal 300 may display information received from the sales conversation analysis apparatus 100 through the user interface.

The customer terminal 400 may comprise, but is not limited to, a smartphone, a tablet PC, a laptop, a desktop, a landline phone, and the like.

Referring to FIG. 1, the sales conversation analysis apparatus 100 is illustrated as a separate device separated from the sales representative terminal 300. However, the embodiment is not limited thereto. For example, the sales conversation analysis method may be performed by the sales representative terminal 300.

Figure 2:
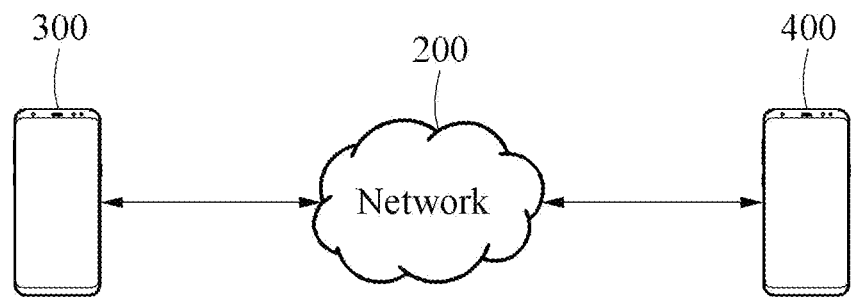
FIG. 2 is a conceptual diagram showing a second embodiment of the sales conversation analysis system.

FIG. 2 is a conceptual diagram showing a second embodiment of the sales conversation analysis system.

Referring to FIG. 2, the sales representative terminal 300 may perform a function performed by the sales conversation analysis apparatus 100 shown in FIG. 1. The sales representative terminal 300 may perform a method for analyzing a sales conversation (sales conversation analysis method) by analyzing a call voice.

Figure 3:
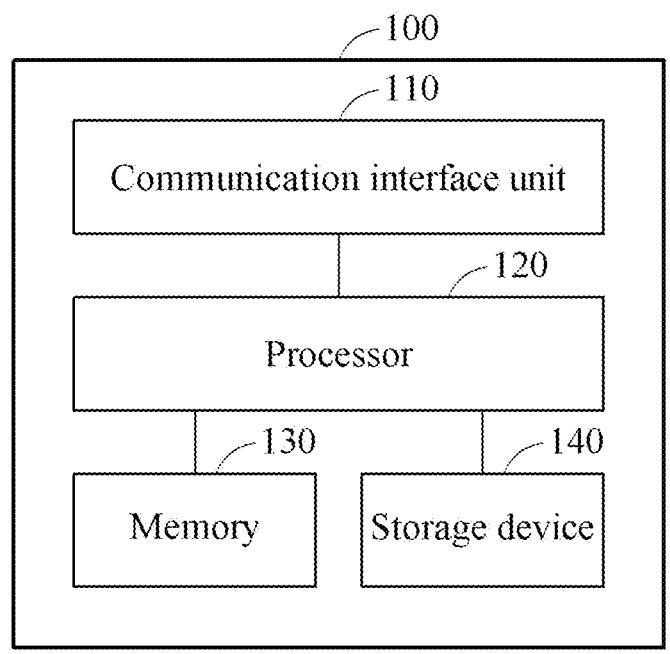
FIG. 3 is a block diagram showing a configuration of an apparatus (100) for analyzing a sales conversation according to an exemplary embodiment.

FIG. 3 is a block diagram showing a configuration of the sales conversation analysis apparatus 100 according to an exemplary embodiment.

Referring to FIG. 3, the sales conversation analysis apparatus 100 according to an exemplary embodiment may comprise a communication interface unit 110, a processor 120, a memory 130, and/or storage devices 130 and 140.

The communication interface unit 110 may operate under the control of the processor 120. The communication interface unit 110 may transmit a signal through a wireless communication method or a wired communication method according to a command of the processor 120. The sales representative terminal 300 may receive the signal transmitted by the communication interface unit 110 through a wireless communication method or a wired communication method. In addition, in a broad sense, the communication interface unit 110 may comprise a keyboard, a mouse, other external input devices, printers, displays, and other external output devices for receiving commands or instructions.

The processor 120 may execute a program command stored in the memory 130 and/or the storage devices 130 and 140. The processor 120 may refer to a central processing unit (CPU), a graphics processing unit (GPU), or a dedicated processor on which methods according to the present invention are performed. The memory 130 and the storage device 140 may be constituted by a volatile storage medium and/or a non-volatile storage medium. For example, the memory 130 may be constituted by a read only memory (ROM) and/or a random access memory (RAM).

The configuration of the sales conversation analysis apparatus 100 described with reference to FIG. 3 is merely exemplary, and the embodiment is not limited thereto. For example, the memory 130 and the storage device 140 of the sales conversation analysis apparatus 100 may not be physically separated. In addition, the sales conversation analysis apparatus 100 may further comprise other components in addition to the components shown in FIG. 3. For example, the sales conversation analysis apparatus 100 may further comprise an input interface unit, an output interface unit, and the like. The input interface unit may comprise a button, a touch screen, a general PC input device, and the like. The output interface unit may comprise a display device, a touch screen, a speaker, and the like.

Figure 4:
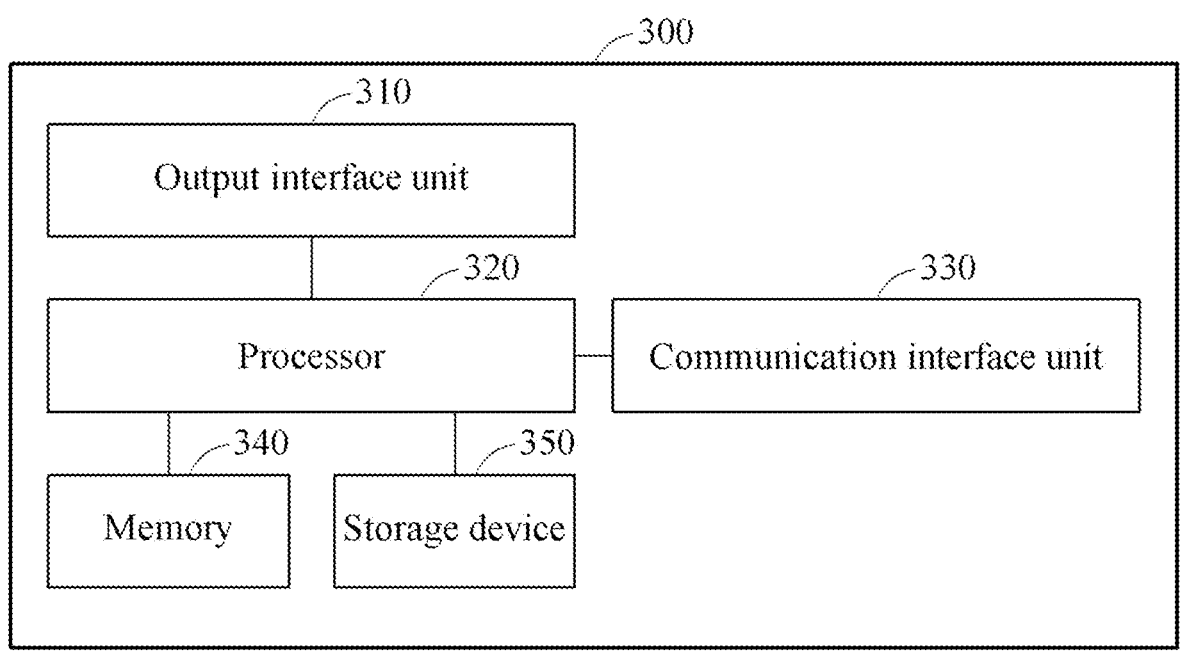
FIG. 4 is a block diagram illustrating a sales representative terminal (300).

FIG. 4 is a block diagram illustrating the sales representative terminal 300. Referring to FIG. 4, the sales representative terminal 300 according to an exemplary embodiment may comprise an output interface unit 310, a processor 320, a communication interface unit 330, and a memory and/or a storage device 340 and/or 350.

The output interface unit 310 may comprise at least one of a display device and a touch screen. The output interface unit 310 may operate under the control of the processor 320. The processor 320 may control the output interface unit 310 based on information received from the sales conversation analysis apparatus 100 through the communication interface unit 330.

The communication interface unit 330 may operate under the control of the processor 320. The communication interface unit 330 may transmit a signal through a wireless communication method or a wired communication method according to a command of the processor 320. The communication interface unit 330 may receive the signal transmitted by the sales conversation analysis apparatus 100 through a wireless communication method or a wired communication method.

The processor 320 may execute a program command stored in the memory 340 and/or the storage device 350. The processor 320 may refer to a central processing unit (CPU), a graphics processing unit (GPU), or a dedicated processor on which methods according to the present invention are performed. The memory 340 and the storage device 350 may be constituted by a volatile storage medium and/or a non-volatile storage medium. For example, the memory 340 may be constituted by a read only memory (ROM) and/or a random access memory (RAM).

The configuration of the sales representative terminal 300 described with reference to FIG. 4 is merely exemplary, and the embodiment is not limited thereto. For example, the memory 340 and the storage device 350 of the sales representative terminal 300 may not be physically separated. In addition, the sales representative terminal 300 may further comprise other components in addition to the components shown in FIG. 3. For example, the terminal 300 may further comprise an input interface unit and the like. The input interface unit may comprise a button, a touch screen, a general PC input device, and the like. Hereinafter, for convenience, the sales conversation analysis method will be described on the assumption that the sales conversation analysis method is performed by the sales conversation analysis apparatus 100 shown in FIG. 1.

Figure 5:
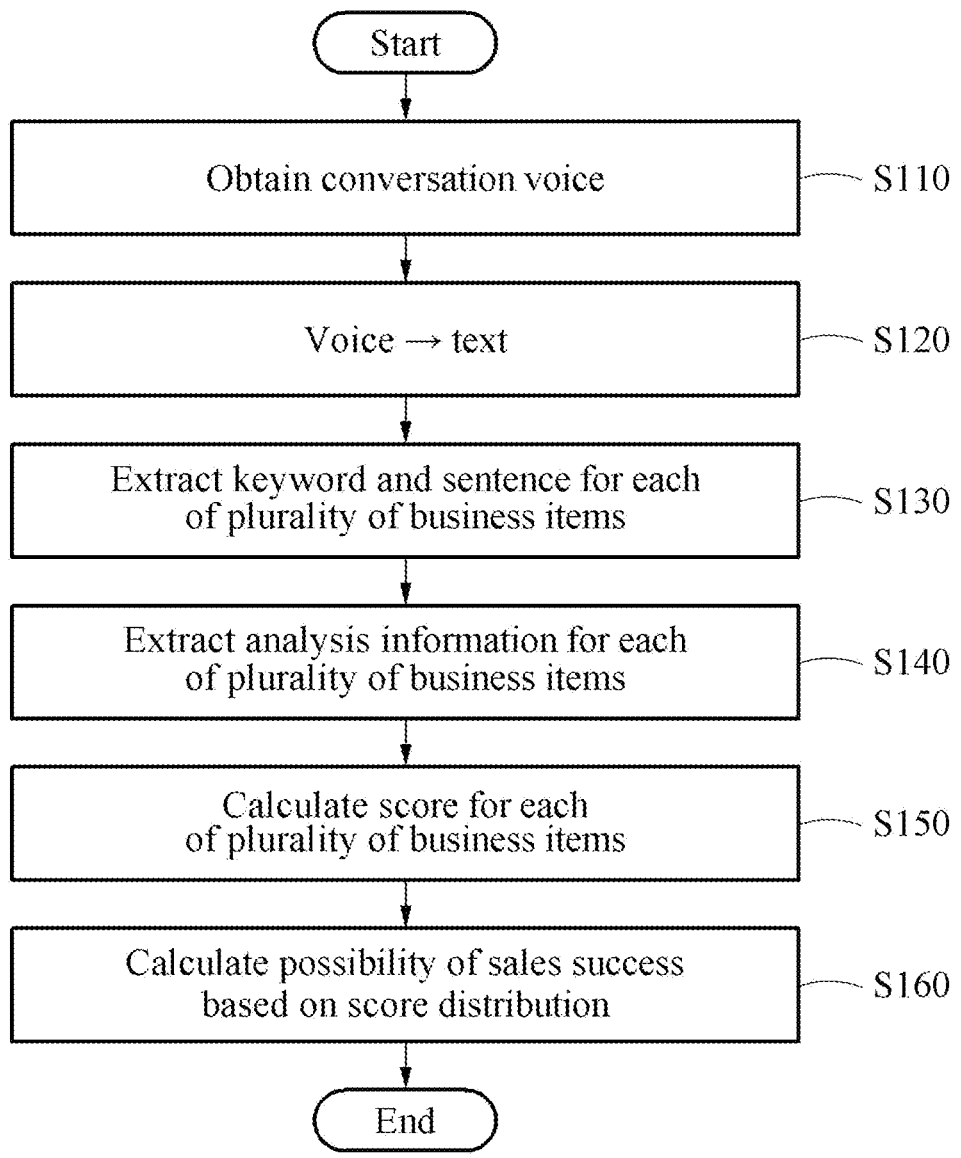
FIG. 5 is a flowchart showing a first embodiment of a method for analyzing a sales conversation performed by the apparatus (100) for analyzing a sales conversation.

FIG. 5 is a flowchart showing a first embodiment of the sales conversation analysis method performed by the sales conversation analysis apparatus 100.

Referring to FIG. 5, the sales conversation analysis method may comprise obtaining voice information about a sales conversation between a sales representative and a customer (S110), converting the voice information into text (S120), extracting at least one of a keyword and a sentence corresponding to each of a plurality of business items from the text (S130), extracting analysis information for each of the plurality of business items based on at least one of the extracted keyword and sentence (S140), and calculating an evaluation score for each of the plurality of business items based on the analysis information for each of the plurality of business items (S150).

In step S110, the sales conversation analysis apparatus 100 may obtain voice information about the sales conversation. By way of example, the sales conversation analysis apparatus 100 may obtain voice information by receiving a recorded voice file from the sales representative terminal 300. For another example, the sales conversation analysis apparatus 100 may receive a recorded voice file from a device other than the sales representative terminal 300. Further, the sales conversation analysis apparatus 100 may obtain voice information by reading a voice file stored in a recording medium. As described with reference to FIG. 2, when the sales representative terminal 300 performs the sales conversation analysis method, the sales representative terminal 300 may analyze the call voice in real time or record the call voice and then read the recorded voice file.

In step S120, the sales conversation analysis apparatus 100 may convert the obtained voice information into text.

The sales conversation analysis apparatus 100 may separate and distinguish the voice of the sales representative and the voice of the customer, from the voice information. By way of example, the sales conversation analysis apparatus 100 may extract a Mel-frequency cepstral coefficient (MFCC) feature vector from the voice, and based on this, separate and extract the voice of the customer and the voice of the sales representative through K-mean clustering. The above description is merely exemplary, and the embodiment is not limited thereto. The sales conversation analysis apparatus 100 may convert voice information into text. As described above, the sales conversation analysis apparatus 100 may identify a speaker for each segment of the voice and store information about the speaker together with the converted text.

By way of example, the sales conversation analysis apparatus 100 may use at least one of a deep neural network (DNN), a hidden Markov model (HMM), a recurrent neural network (RNN), and a long short-term memory (LSTM) to convert voice information into text, but the embodiment is not limited thereto. The sales conversation analysis apparatus 100 may analyze voice information by a continuous language recognition method. The sales conversation analysis apparatus 100 may analyze voice information in consideration of a case in which a plurality of words are combined in the voice information. However, the embodiment is not limited thereto.

The sales conversation analysis apparatus 100 may extract information on emotional changes by extracting features of intonation and tone changes from the voice of the customer or sales representative. The sales conversation analysis apparatus 100 may store information on emotional changes together with text.

In step S130, the sales conversation analysis apparatus 100 may extract, from the text, at least one of a keyword and a sentence for each of a plurality of business items. The plurality of business items described above may include at least one of a budget of the customer, an authority of the customer, needs of the customer, a purchase time (timeline), and a competitor of the product or service provider. However, the embodiment is not limited to the above items. For example, the number of business items may be less than or greater than five. The business items may not include some of the five items described above. The business items may include other items in addition to the five items described above. For example, the business items may include at least one of a transaction condition and a customer question.

Figure 6:
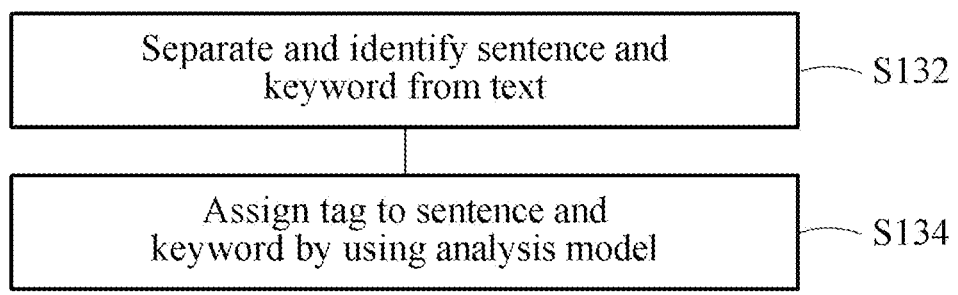
FIG. 6 is a flowchart showing step S130 of FIG. 5 in more detail.

FIG. 6 is a flowchart showing step S130 of FIG. 5 in more detail.

Referring to FIG. 6, in step S132, the sales conversation analysis apparatus 100 may divide the text into sentence units. The sales conversation analysis apparatus 100 may separate sentence components included in the text and identify words based thereon.

In step S134, the sales conversation analysis apparatus 100 may assign a tag to a sentence included in the text by using an artificial neural network. The tag may correspond to any one of the plurality of business items described above. The sales conversation analysis apparatus 100 may train the artificial neural network by using the training data. The training data may include training text and tag information assigned to the sentence included in the training text. The sales conversation analysis apparatus 100 may train the artificial neural network in a supervised learning or unsupervised learning method. The sales conversation analysis apparatus 100 may assign a tag to a keyword included in text by using the artificial neural network. The tag may correspond to any one of the plurality of business items described above. The sales conversation analysis apparatus 100 may train the artificial neural network using the training data. The training data may include training text and tag information assigned to the keyword included in the training text.

In step S140, the sales conversation analysis apparatus 100 may extract analysis information for each of the business items based on at least one of a keyword and a sentence corresponding to each of the business items. For example, the sales conversation analysis apparatus 100 may extract analysis information about the budget item by analyzing at least one of a keyword and a sentence to which a budget tag is assigned. Similarly, the sales conversation analysis apparatus 100 may extract analysis information about the authority item by analyzing at least one of a keyword and a sentence to which an authority tag is assigned.

By way of example, the sales conversation analysis apparatus 100 may use at least one of the deep neural network (DNN), the hidden Markov model (HMM), the recurrent neural network (RNN), and the long short-term memory (LSTM) to analyze at least one of the keyword and the sentence. The sales conversation analysis apparatus 100 may semantically interpret at least one of the keyword and the sentence, and extract information on the business item based on the analysis result.

FIGS. 7A and 7B are conceptual diagrams illustrating that keywords, sentences, and analysis information are extracted for each business item from a conversation text.

Referring to FIGS. 7A and 7B, the sales conversation analysis apparatus 100 may divide the conversation text into sentence units. The sales conversation analysis apparatus 100 may extract a main keyword from each sentence by using the artificial neural network. For example, the sales conversation analysis apparatus 100 may extract the keyword "deputy manager" from a first sentence and extract the keywords "current" and "cloud service" from a third sentence.

In step S130, the sales conversation analysis apparatus 100 may assign tags corresponding to any one of business items to at least one of keywords and sentences. For example, the sales conversation analysis apparatus 100 may assign authority tags to 1st, 2nd, and 24th sentences and keywords. If necessary, as indicated in No. 24, the sales conversation analysis apparatus 100 may assign two or more tags to one sentence. The sales conversation analysis apparatus 100 may assign a needs tag to 3rd to 11th, 13th, 14th, 16th, 19th, and 20th sentences and keywords. The sales conversation analysis apparatus 100 may assign a budget tag to 23rd and 24th sentences and keywords. The sales conversation analysis apparatus 100 may assign a purchase time tag to 21st and 22nd sentences and keywords. The sales conversation analysis apparatus 100 may assign a competitor tag to a 15th sentence and keyword. The sales conversation analysis apparatus 100 may not assign tags to some sentences and keywords.

The sales conversation analysis apparatus 100 may record information on the change in the emotion of the speaker for each sentence or keyword. For example, the sales conversation analysis apparatus 100 may detect that the change in the emotion of the speaker has occurred in 5th, 9th, 12th, 18th, 22nd, 24th, and 26th sentences, and record information thereon. The sales conversation analysis apparatus 100 may extract emotional words that frequently appear in conversations from the training data. Here, the emotional word may include a keyword related to emotion. For example, the emotional word may include keywords such as "probably", "not yet", "not at all", "good", "well", and the like, but the embodiment is not limited thereto. The sales conversation analysis apparatus 100 may give weights or additional points to sentences including the emotional words or sentences adjacent to the emotional words. For example, the sales conversation analysis apparatus 100 may give a high weight or an additional score to the 13th sentence following "well" included in the 12th sentence of FIG. 7A. For example, the sales conversation analysis apparatus 100 may give a high weight to the keyword of the needs item extracted from the 13th sentence. The sales conversation analysis apparatus 100 may add an additional score when the score for the needs item is calculated from the 13th sentence. As another example, the sales conversation analysis apparatus 100 may multiply a weight (e.g., 1.5 times) by the score of the needs item calculated from the 13th sentence. In FIGS. 7A and 7B, emotional change values are expressed as integers, but the embodiment is not limited thereto. For example, the information on the change in the emotion may be expressed by a real number or a symbol other than an integer.

The sales conversation analysis apparatus 100 may give a high weight to a sentence or keyword generated in a section in which the absolute value of the emotional change is large. The sales conversation analysis apparatus 100 may give high importance to analysis information extracted from a sentence or keyword having a high weight. The sales conversation analysis apparatus 100 may preferentially display analysis information with high importance on the user interface.

The sales conversation analysis apparatus 100 may give a high weight to a sentence or keyword generated in a section in which no emotional change occurs. For example, the sales conversation analysis apparatus 100 may semantically analyze a sentence or keyword and assign a high weight to a sentence or keyword having high importance based thereon.

The sales conversation analysis apparatus 100 may extract analysis information for each business item. For example, the sales conversation analysis apparatus 100 may extract analysis information related to the authority of the customer from the 1st, 2nd, and 24th sentences and keywords to which the authority tag is assigned in relation to the authority item.

Referring back to FIG. 5, in step S150, the sales conversation analysis apparatus 100 may calculate a score for each business item based on the analysis information for each business item. The sales conversation analysis apparatus 100 may calculate a score for each business item based on at least one of the amount of analysis information and the content of the analysis information for each business item. For example, the sales conversation analysis apparatus 100 may calculate a relatively high score for a business item in which the amount of analysis information is relatively abundant. The sales conversation analysis apparatus 100 may calculate a relatively low score for a business item in which the amount of analysis information is relatively insufficient. In addition, the sales conversation analysis apparatus 100 may calculate a relatively high score for a business item in which the contents of the analysis information are relatively positive for the conclusion of a transaction. The sales conversation analysis apparatus 100 may calculate a relatively low score for a business item in which the contents of the analysis information are relatively negative for the conclusion of the transaction. As described above, the sales conversation analysis apparatus 100 may more systematically and accurately analyze the sales conversation by calculating the evaluation score for each of the plurality of business items. In addition, quantitative analysis of the sales conversation may be facilitated by the user checking the score for each business item.

In step S160, the sales conversation analysis apparatus 100 may calculate a probability of sales success based on the evaluation score for each of the plurality of business items. For example, the sales conversation analysis apparatus 100 may calculate the probability of sales success based on the sum of the evaluation scores for each of the plurality of business items. As another example, the sales conversation analysis apparatus 100 may give different weights to the evaluation scores for each of a plurality of business items, and calculate the sum of the evaluation scores in consideration of the weights.

As yet another example, the sales conversation analysis apparatus 100 may calculate the probability of sales success based on the distribution of the evaluation scores for the items without calculating the sum of the evaluation scores for each of the plurality of business items. When the influence of each of a plurality of business items on different business items is considered, the sum of evaluation scores may not necessarily be proportional to the probability of sales success. Accordingly, the sales conversation analysis apparatus 100 may increase the accuracy and reliability of the calculation by calculating the probability of sales success using a correlation between the probability of sales success and a score distribution derived from the existing case analysis result.

Figure 8:
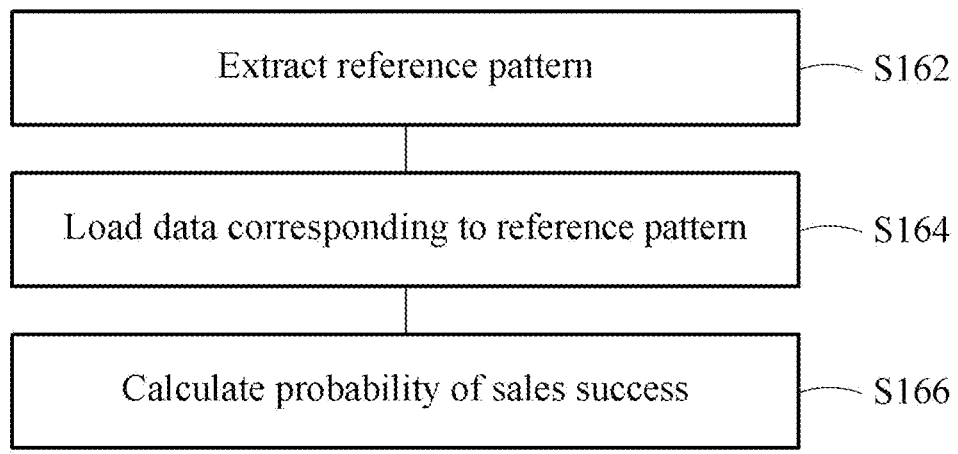
FIG. 8 is a flowchart showing step S160 of FIG. 5 in more detail.

FIG. 8 is a flowchart showing step S160 of FIG. 5 in more detail.

Referring to FIG. 8, in step S162, the sales conversation analysis apparatus 100 may extract at least one reference distribution identical to or similar to the score distribution calculated in step S150 from a reference table stored in advance. The reference table may store reference distributions prepared based on the case analysis result, a probability of sales success corresponding to each reference distribution, the number of samples, and the like. Here, the number of samples may refer to the number of samples for which a score distribution identical to the corresponding reference distribution is calculated among voice analysis samples used in the case analysis.

In step S164, the sales conversation analysis apparatus 100 may load data corresponding to the extracted reference distribution from the reference table. When there are a plurality of extracted reference distributions, the sales conversation analysis apparatus 100 may load all data corresponding to a plurality of reference distributions.

In step S166, the sales conversation analysis apparatus 100 may calculate the probability of sales success based on data corresponding to the reference distribution.

Figure 9:
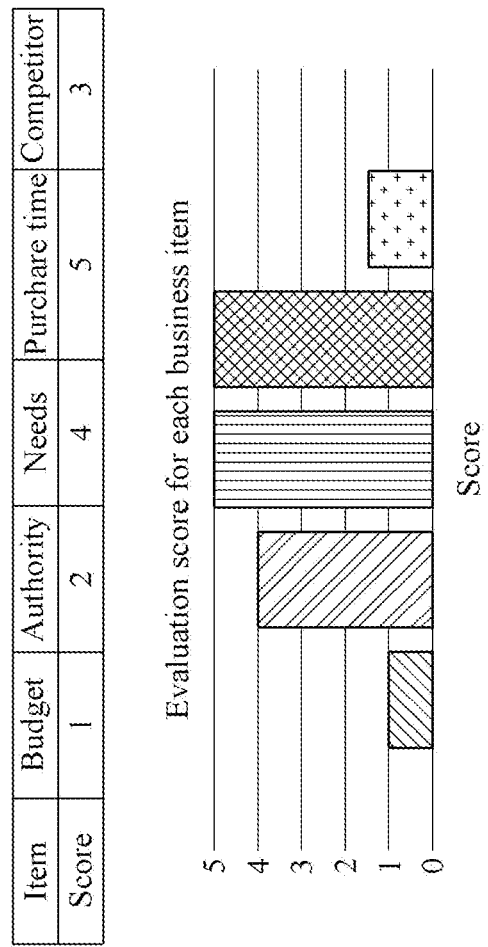
FIG. 9 is a conceptual diagram showing a first embodiment of extracting a reference distribution and calculating a probability of sales success.

FIG. 9 is a conceptual diagram showing a first embodiment of extracting a reference distribution and calculating a probability of sales success. The schema of the reference table shown in FIG. 9 is merely exemplary and the embodiment is not limited thereto. For example, the reference table may not include some of the columns shown in FIG. 9 or may further include other columns not shown in FIG. 9. In addition, although evaluation scores for each business item are displayed as integers in FIG. 9, the embodiment is not limited thereto. For example, the evaluation score may be displayed as a real number other than an integer or symbol.

Referring to FIG. 9, the sales conversation analysis apparatus 100 may select the same reference distribution (e.g., identification number 8) as the score distribution (e.g., budget: 1, authority: 2, needs: 4, purchase time: 5, competitor: 3) calculated in step S150. In this case, the sales conversation analysis apparatus 100 may select one reference distribution. Of course, the sales conversation analysis apparatus 100 may further select a reference distribution similar to the score distribution as well as the reference distribution identical to the score distribution, unlike shown in FIG. 10.

The sales conversation analysis apparatus 100 may check data corresponding to the reference distribution. For example, the sales conversation analysis apparatus 100 may determine whether the number of samples corresponding to the reference distribution is sufficient. When the number of samples corresponding to the reference distribution is insufficient, the sales conversation analysis apparatus 100 may not select the reference distribution since reliability of data is insufficient. As another example, the sales conversation analysis apparatus 100 may select the reference distribution in consideration of only the deviation between the reference distribution and the score distribution regardless of the number of samples.

The sales conversation analysis apparatus 100 may load data corresponding to the selected reference distribution and calculate a probability of sales success based on the loaded data. For example, as shown in FIG. 10, when the sales conversation analysis apparatus 100 selects one reference distribution (e.g., identification number 8) identical to the score distribution, the sales conversation analysis apparatus 100 may determine a probability of success of 0.78 corresponding to identification number 8 as the probability of sales success.

In FIG. 9, the perfect score for each business item is equally expressed as 5 points, but the embodiment is not limited thereto. As an example, the sales conversation analysis apparatus 100 may set different perfect score criteria for the score for each business item according to a category of a sales target product or service. The sales conversation analysis apparatus 100 may analyze data obtained in advance to determine a priority of a business item for each category of the sales target product or service, and may set a higher perfect score criterion for a business item having a high priority. For example, when the proportion of the "budget" item is large in the success or failure of sales of the corresponding product or service, the sales conversation analysis apparatus 100 may set the perfect score criterion for of the "budget" item to be higher than 5 points. As another example, the sales conversation analysis apparatus 100 may set the weight for the score of the "budget" item to be higher than the score weights for the other items. Accordingly, sales conversation analysis can be performed by being optimized for the sales target product or service.

Figure 10:
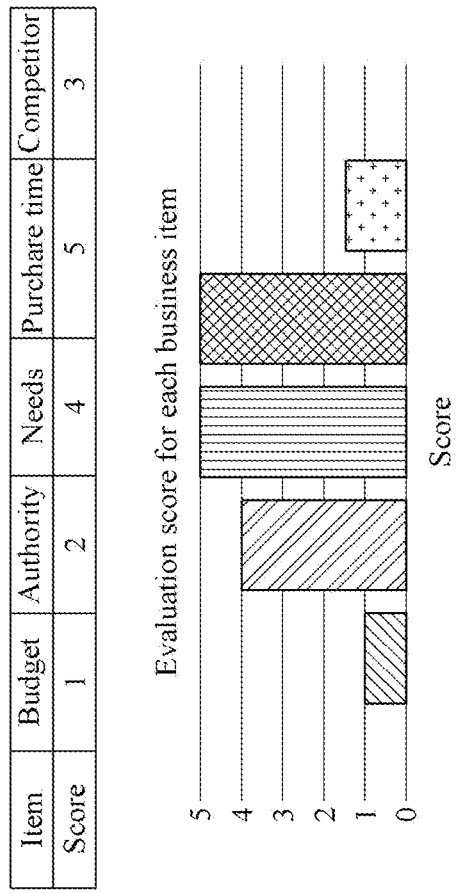
FIG. 10 is a conceptual diagram showing a second embodiment of extracting a reference distribution and calculating a probability of sales success.

FIG. 10 is a conceptual diagram showing a second embodiment of extracting a reference distribution and calculating a probability of sales success. In the description of the embodiment of FIG. 10, contents that have been already shown in the description of FIG. 9 may be omitted.

Referring to FIG. 10, the sales conversation analysis apparatus 100 may load data corresponding to the same reference distribution (e.g., identification number 8) as the score distribution (e.g., budget: 1, authority: 2, needs: 4, purchase time: 5, competitor: 3) calculated in step S150. The sales conversation analysis apparatus 100 may check the number of samples corresponding to identification number 8. The sales conversation analysis apparatus 100 may compare the number of samples with the reference number. When the number of samples is smaller than the reference number, the sales conversation analysis apparatus 100 may not select a reference distribution corresponding to the corresponding identification number.

The sales conversation analysis apparatus 100 may select the reference distribution (e.g., identification number 15) with the smallest sum of score distribution and deviation (e.g., the sum of absolute values of score deviations for each item) from among reference distributions in which the number of samples is greater than the reference number. The sales conversation analysis apparatus 100 may determine a probability of success (e.g. 0.91) corresponding to the identification number 15 as the probability of sales success.

FIG. 11 is a conceptual diagram showing a third embodiment of extracting a reference distribution and calculating a probability of sales success. In the description of the embodiment of FIG. 11, contents that have been already shown in the descriptions of FIGS. 9 and 10 may be omitted.

Referring to FIG. 11, the sales conversation analysis apparatus 100 may load data corresponding to the same reference distribution (e.g., identification number 8) as the score distribution (e.g., budget: 1, authority: 2, needs: 4, purchase time: 5, competitor: 3) calculated in step S150. The sales conversation analysis apparatus 100 may check the number of samples corresponding to identification number 8. The sales conversation analysis apparatus 100 may compare the number of samples with the reference number. When the number of samples is smaller than the reference number, the sales conversation analysis apparatus 100 may not select a reference distribution corresponding to the corresponding identification number.

The sales conversation analysis apparatus 100 may select a plurality of reference distributions in consideration of the sum of the deviation between the reference distribution and the score distribution (e.g., the sum of absolute values of the score deviations for each item) and the number of samples. For example, the sales conversation analysis apparatus 100 may select reference distributions of identification numbers 15 and 16 in which the sum of the deviation between the reference distribution and the score distribution is 2 and the number of samples is sufficient. In addition, the sales conversation analysis apparatus 100 may select the reference distribution of the identification number 17, which has high reliability due to relatively large number of samples, although the sum of the deviation between the reference distribution and the score distribution is 3.

The sales conversation analysis apparatus 100 may calculate an average value (e.g. 0.8) of success probability values corresponding to identification numbers 15, 16, and 17. The sales conversation analysis apparatus 100 may determine the average value as the probability of sales success. As another example, the sales conversation analysis apparatus 100 may give different weights to each identification number in consideration of the reliability according to the number of samples and the sum of the deviation between the reference distribution and the score distribution. The sales conversation analysis apparatus 100 may calculate the probability of sales success by multiplying the probability of success corresponding to each identification number by a weight, and summing or averaging the values multiplied by the weight.

Figure 12:
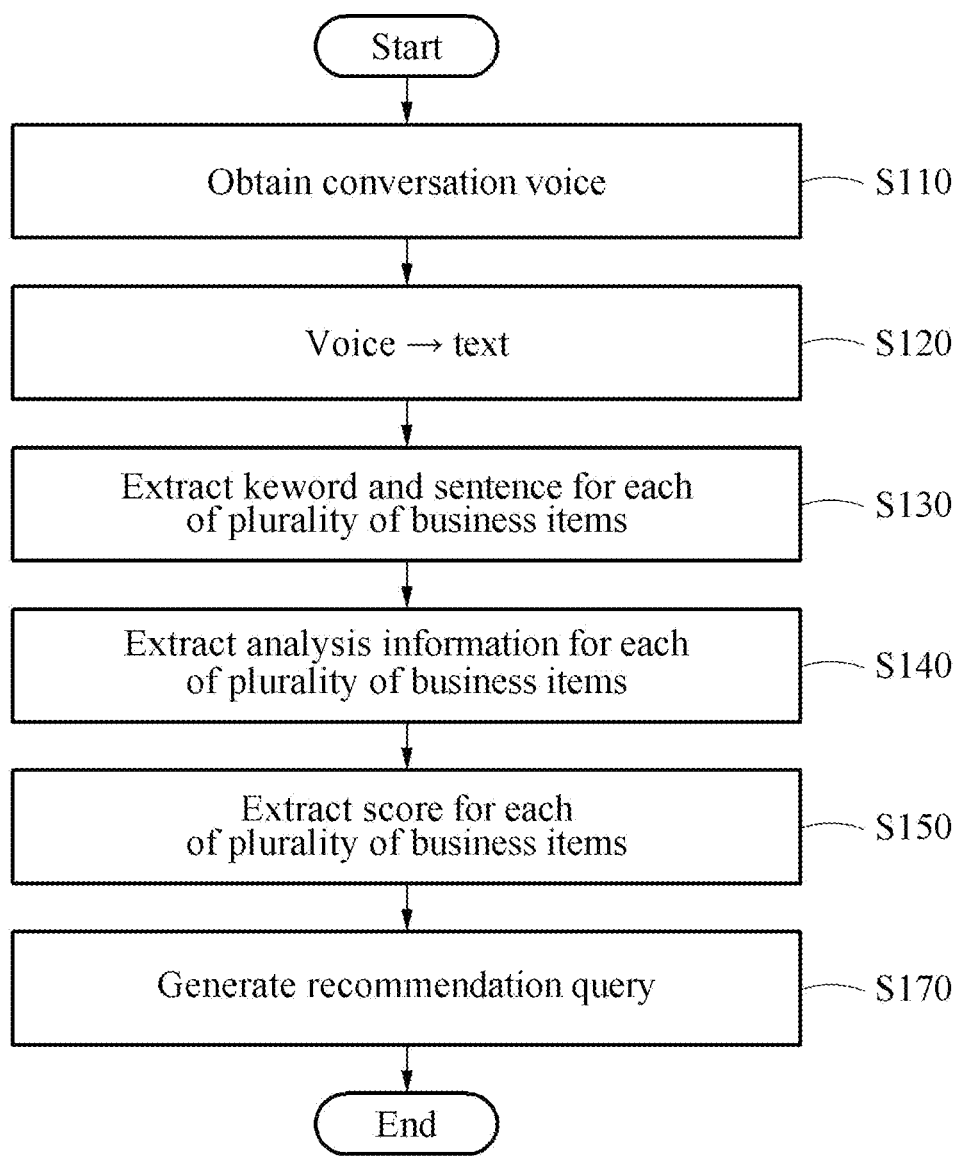
FIG. 12 is a flowchart showing a second embodiment of a method for analyzing a sales conversation performed by the apparatus (100) for analyzing a sales conversation.

FIG. 12 is a flowchart showing a second embodiment of the method for analyzing a sales conversation performed by the sales conversation analysis apparatus 100. In the description of the embodiment of FIG. 12, contents that have been already shown in the description of FIG. 5 may be omitted.

Referring to FIG. 12, in step S170, the sales conversation analysis apparatus 100 may generate a recommendation query for at least one business item based on at least one of analysis information for each of the plurality of business items and the evaluation score for each of the plurality of business items. For example, the sales conversation analysis apparatus 100 may generate a recommendation query for a business item in which the amount of analysis information is insufficient. The sales conversation analysis apparatus 100 may generate the recommendation query based on at least one of a sentence and a keyword corresponding to a business item in which the amount of analysis information is insufficient. As another example, the sales conversation analysis apparatus 100 may generate a recommendation query for a business item having an evaluation score lower than the reference score. As yet another example, the sales conversation analysis apparatus 100 may consider both the evaluation score and the amount of analysis information.

Figure 13:
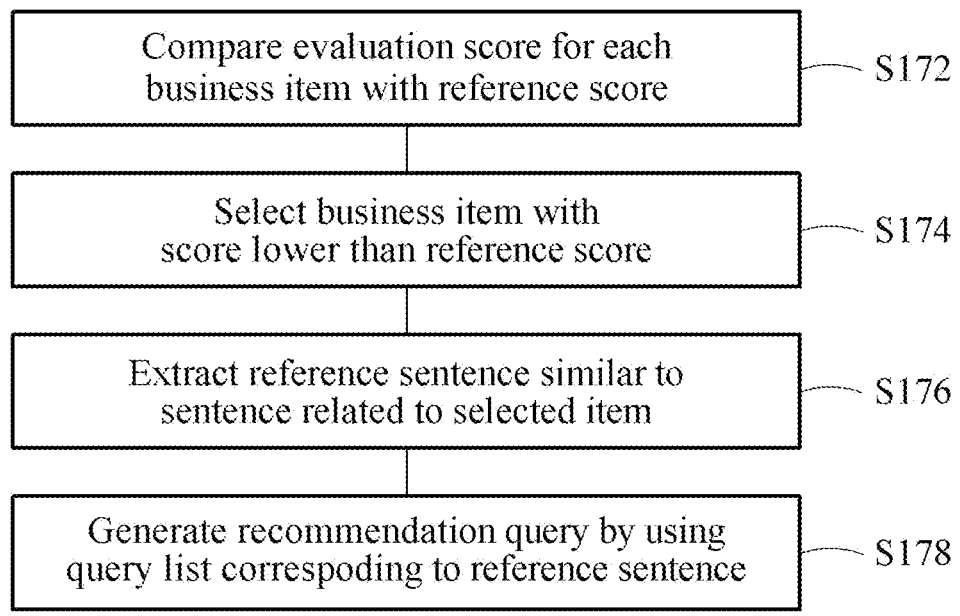
FIG. 13 is a flowchart showing step S170 of FIG. 12 in more detail.

FIG. 13 is a flowchart showing step S170 of FIG. 12 in more detail.

Referring to FIG. 13, in step S172, the sales conversation analysis apparatus 100 may compare the evaluation score for each business item with the reference score. In step S174, the sales conversation analysis apparatus 100 may select an item having an evaluation score lower than the reference score (e.g. 3 points) (e.g., budget and authority in FIGS. 10 to 12).

In step S176, the sales conversation analysis apparatus 100 may extract a reference sentence similar to the sentence extracted from the text in relation to the selected item from the reference DB. A plurality of preset reference sentences and query lists corresponding to respective reference sentences may be stored in the reference DB. The reference sentence and the query list corresponding to the reference sentence may be prepared by a business expert or by a computing device analyzing a business conversation.

The sales conversation analysis apparatus 100 may analyze a similarity or relevance between the sentences corresponding to the business items and the reference sentences stored in the reference DB. The sales conversation analysis apparatus 100 may analyze the similarity or relevance by using the artificial neural network. For example, the sales conversation analysis apparatus 100 may analyze the similarity or relevance by calculating a feature distance between the sentence and the reference sentence.

In step S178, the sales conversation analysis apparatus 100 may generate a recommendation query by using the query list corresponding to the reference sentence. The sales conversation analysis apparatus 100 may correct a word that needs to be corrected in the queries included in the query list.

Figure 14:
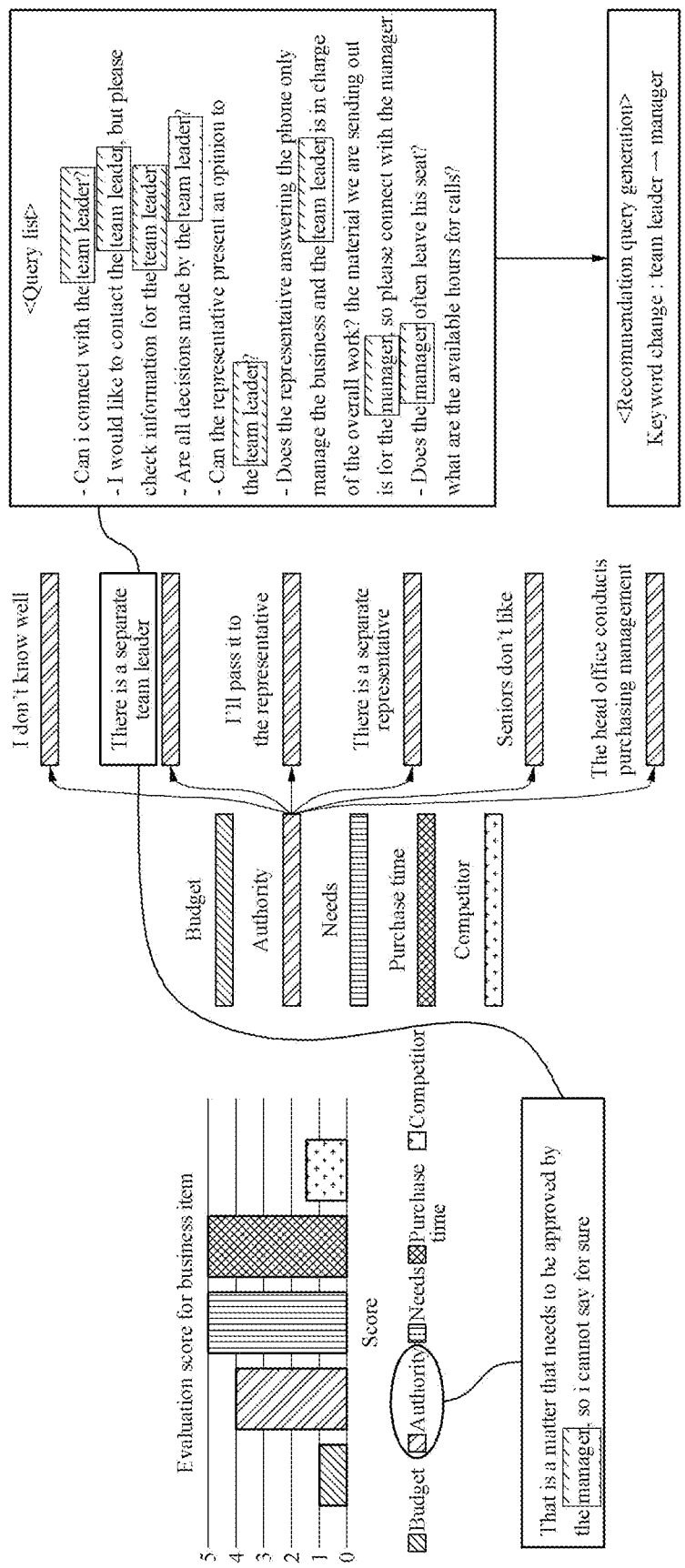
FIG. 14 is a conceptual diagram showing a process of generating a recommendation query.

FIG. 14 is a conceptual diagram showing a process of generating a recommendation query.

Referring to FIG. 14, the sales conversation analysis apparatus 100 may generate a recommendation query for an authority item having an evaluation score lower than the reference score. Of course, the sales conversation analysis apparatus 100 may generate a recommendation query for the budget item. The sales conversation analysis apparatus 100 may analyze a similarity or relevance between sentences (e.g., "that is a matter that needs to be approved by the manager, so I cannot say for sure") related to the authority item from the text and reference sentences corresponding to the authority item. The sales conversation analysis apparatus 100 may load a query list corresponding to a reference sentence having a high similarity or relevance (e.g., "There is a separate team leader"). The sales conversation analysis apparatus 100 may generate a recommendation query by correcting a word (e.g., "team leader") that needs to be corrected in the query included in the query list using information (e.g., "manager") extracted from the sentence related to the authority item.

In the above examples, the budget, authority, needs, purchase timing, and competitor are presented as business items. However, the embodiment is not limited thereto. For example, the business item may further include other items. The business item may further include an item for a customer question.

As shown in FIGS. 7A and 7B, the sales conversation analysis apparatus 100 may assign a question or answer tag to at least some of the sentences. The sales conversation analysis apparatus 100 may extract the number of customer questions from the text. That is, analysis information related to the customer question item may include information on the number of customer questions. The analysis information related to the customer question item may further include information about the pending question. The information about the pending question may include the content of the pending question and the answer to the pending question.

Figure 15:
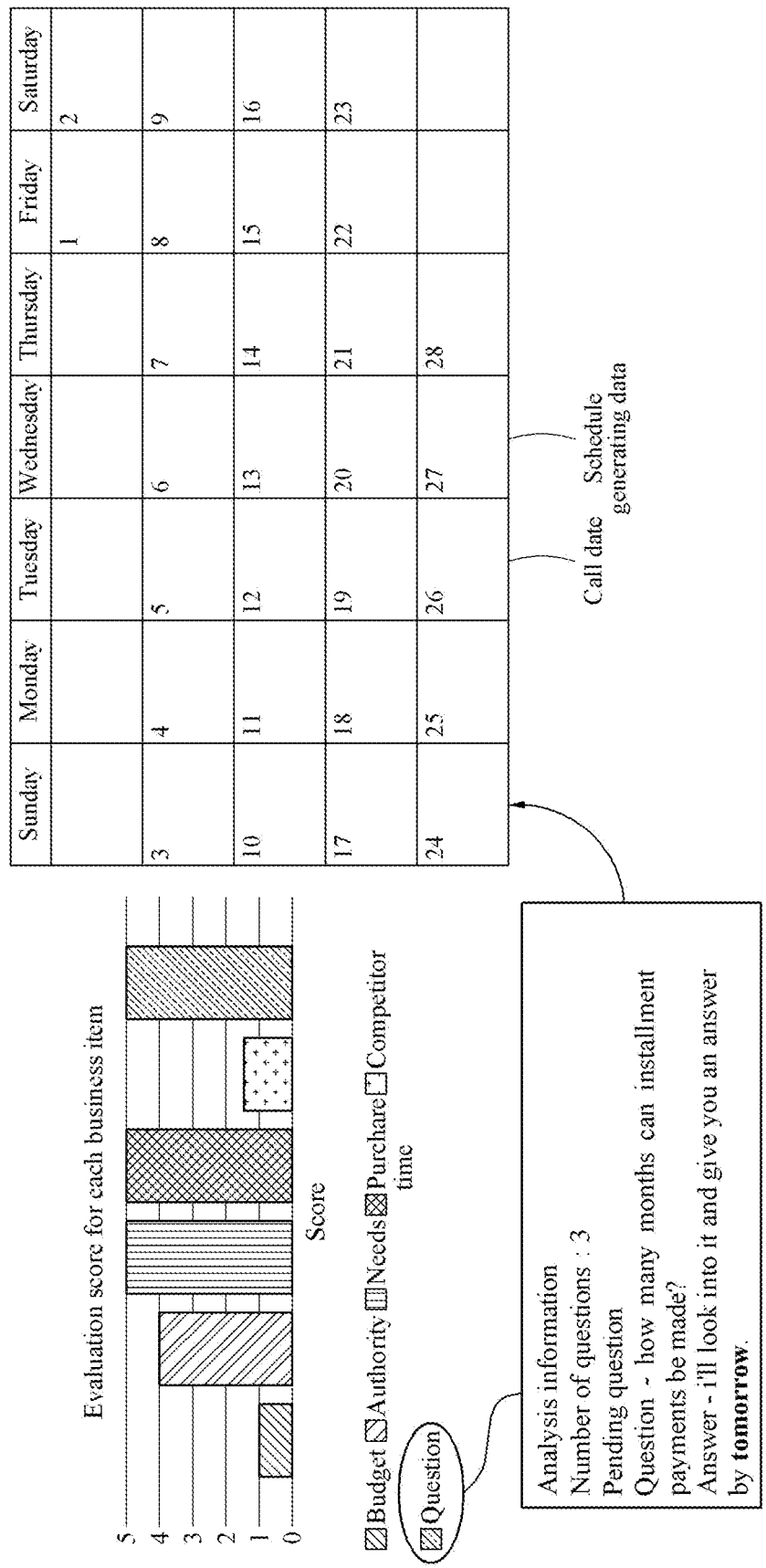
FIG. 15 is a conceptual diagram illustrating a process of generating analysis information and schedule data related to a customer question item.

FIG. 15 is a conceptual diagram illustrating a process of generating analysis information and schedule data related to a customer question item.

Referring to FIG. 15, the sales conversation analysis apparatus 100 may extract information on a deadline of a pending question from an answer to the pending question. For example, the sales conversation analysis apparatus 100 may extract a keyword "tomorrow" from an answer sentence to the pending question, and based on the word, generate answer schedule information for the pending question on the 27th, one day after the conversation day (e.g., 26th). When the answer to the pending question does not include the deadline for the pending question, the sales conversation analysis apparatus 100 may generate schedule information (e.g., 28 days) by adding a default period (e.g., 2 days) from the conversation point.

The sales conversation analysis apparatus 100 may transmit the generated schedule information to the sales representative terminal 300. The sales representative terminal 300 may update data of the schedule application by using the received schedule information. As another example, when the sales representative terminal 300 performs the sales conversation analysis method, the sales representative terminal 300 may generate schedule data by itself and update the data of the schedule application.

Figure 16:
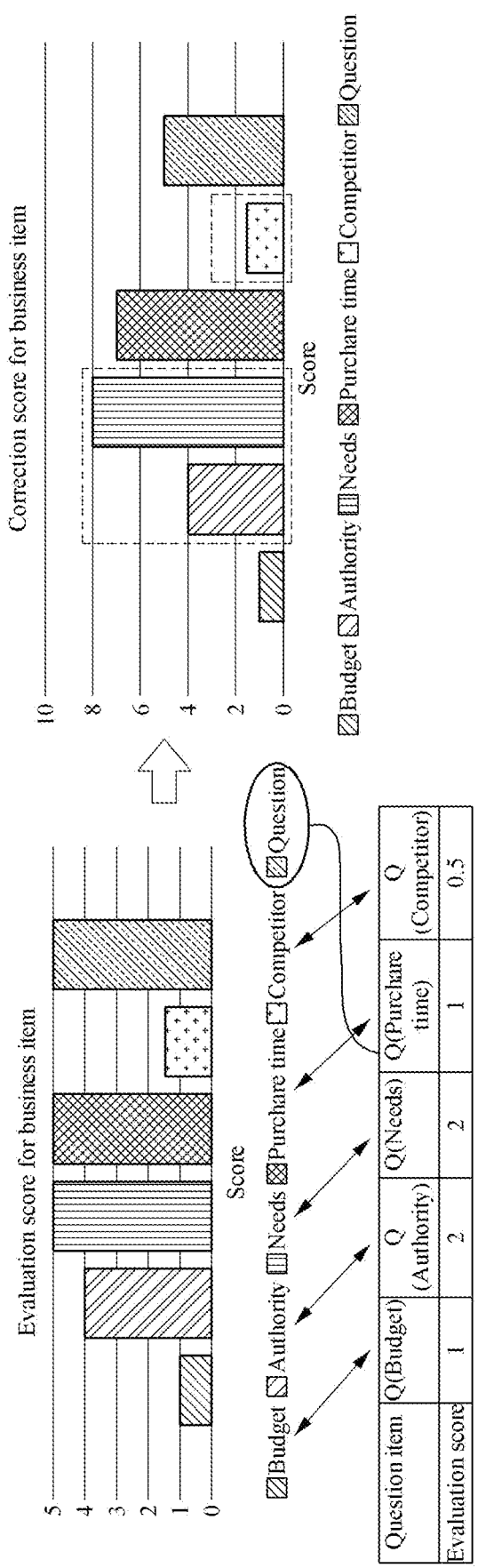
FIG. 16 is a conceptual diagram illustrating correction of a score for each business item based on an analysis of a customer question.

FIG. 16 is a conceptual diagram illustrating correction of a score for each business item based on an analysis of a customer question.

Referring to FIG. 16, the sales conversation analysis apparatus 100 may categorize customer questions in a conversation according to business items. The sales conversation analysis apparatus 100 may analyze a keyword included in the customer question. The sales conversation analysis apparatus 100 may categorize customer questions according to business items based on keywords included in the customer's questions and a result of semantic analysis of the customer questions. Table 1 exemplarily shows that the customer questions are categorized according to business items.

TABLE 1

| | Exmaple Sentence |
|---|---|
| Q(Budget) | May I know how much is the basic fee per month? |
| Q(Authority) | Who should I ask for a discount? |
| Q(Needs) | Are screenshots provided on the monitoring screen when using AWS? |
| Q(Purchase Time) | When will the service be ready? |
| Q(Competitor) | Is the A/S period shorter than Company A? |

The sales conversation analysis apparatus 100 may calculate an evaluation score for a customer question corresponding to each item by analyzing the customer question corresponding to each item. For example, the sales conversation analysis apparatus 100 may calculate an evaluation score for a customer question corresponding to each item by analyzing the number of customer questions corresponding to each item, keywords included in the questions, semantic content of the questions, or the like. For example, when the number of customer questions for the needs item is large among the business items and the content of the question is positive for the business, the sales conversation analysis apparatus 100 may calculate a relatively high customer question score for the needs item. As another example, when the number of customer questions for the competitor is small or the customer asks a question with a negative meaning about the competitor, the sales conversation analysis apparatus 100 may calculate a low question score for the competitor item.

The sales conversation analysis apparatus 100 may correct the evaluation score of the conversation for each business item in consideration of the customer question for each business item. For example, the sales conversation analysis apparatus 100 may calculate a corrected score by multiplying the evaluation score for each business item and the question evaluation score for each business item before correction. For example, as shown in FIG. 16, the score after correction may be higher than the score before correction for the authority item and the needs item with good evaluation scores for the questions. On the other hand, for the competitor item with a low evaluation score for the question, the score after correction may be lower than the score before correction. In the above example, a case in which a multiplication operation is performed in the process of correcting the score has been described, but the embodiment is not limited thereto. For example, the sales conversation analysis apparatus 100 may calculate a corrected score for each item by adding up the evaluation score before correction and the question evaluation score. As described above, the sales conversation analysis apparatus 100 may further improve the accuracy of the sales conversation analysis by correcting the evaluation score for each business item.

In the above the sales conversation method and apparatus according to exemplary embodiments have been described above with reference to FIGS. 1 to 16. According to at least one embodiment, by automating the analysis operation for the sales conversation, it is possible to reduce the labor and time required for the analysis of the sales conversation. According to at least one embodiment, by extracting analysis information about a plurality of business items from voice information on the sales conversation, it is possible to perform accurate and systematic analysis on the sales conversation. According to at least one embodiment, by calculating an evaluation score for each of a plurality of business items and calculating a probability of sales success based on the distribution of the evaluation scores, it is possible to perform highly reliable quantitative analysis on the sales conversation. According to at least one embodiment, by generating a recommendation query based on the sales conversation voice, it is possible to increase the probability of the sales success.

According to at least one embodiment, by automating the analysis operation for the sales conversation, it is possible to reduce the labor and time required for the analysis of the sales conversation. According to at least one embodiment, by extracting analysis information about a plurality of business items from voice information on the sales conversation, it is possible to perform accurate and systematic analysis on the sales conversation. According to at least one embodiment, by calculating an evaluation score for each of a plurality of business items and calculating a probability of sales success based on the distribution of the evaluation scores, it is possible to perform highly reliable quantitative analysis on the sales conversation. According to at least one embodiment, by generating a recommendation query based on the sales conversation voice, it is possible to increase the probability of the sales success.

The methods according to the present invention may be implemented in the form of program instructions that may be executed by various computer means and recorded in a computer-readable medium. The computer-readable medium may include program instructions, a data file, a data structure, or the like alone or in combination. The program instructions recorded on the computer-readable medium may be specially designed and configured for the present invention, or may be known and available to those skilled in the art of computer software.

Examples of computer-readable medium include hardware devices specially configured to store and carry out program instructions, such as a ROM, a RAM, a flash memory, and the like. Examples of the program instructions may include not only machine language codes such as those produced by a compiler, but also high-level language codes that can be executed by a computer using an interpreter or the like. The above-described hardware device may be configured to operate as at least one software modules to perform operations of the present invention, and vice versa.

Although the present invention has been described with reference to embodiments, it is understood that one ordinary skilled in the art can make various changes and modifications to the present invention without departing from the spirit and scope of the present invention as hereinafter claimed.

What is claimed is:

1. A method for analyzing a sales conversation based on voice recognition, the method performed by a processor executing instructions stored in a memory and comprising:
   obtaining, via a communication interface unit, voice information about a sales conversation between a sales representative and a customer;
   converting, by using a deep neural network (DNN), the voice information into text,
   wherein the converting of the voice information into the text comprises: extracting, using a sales conversation analysis apparatus, a Mel-frequency cepstral coefficient (MFCC) feature vector from voices of the sales representative and the customer, and separating and extracting the voice of the sales representative and the voice of the customer based on the extracted MFCC vector through K-mean clustering;
   extracting at least one of a keyword and a sentence corresponding to each of a plurality of business items from the text;
   extracting analysis information for each of the plurality of business items based on at least one of the keyword and the sentence;
   calculating an evaluation score for each of the plurality of business items based on the analysis information for each of the plurality of business items,
   wherein the plurality of business items includes items about a budget of a customer, an authority of the customer, needs of the customer, a purchase time of the customer, and a competitor of a sales entity,
   wherein first information about the budget of the customer, second information about the authority of the customer, third information about the needs of the customer, fourth information about the purchase time of the customer, and fifth information about the competitor of the sales entity are extracted, and
   wherein a first score for the budget of the customer is calculated based on the first information, a second score for the authority of the customer is calculated based on the second information, a third score for the needs of the customer is calculated based on the third information, a fourth score for the purchase time of the customer is calculated based on the fourth information, and a fifth score for the competitor of the sales entity is calculated based on the fifth information;
   automatically outputting, by involving the DNN, a recommendation query for at least one business item based on at least one of analysis information for each of the plurality of business items and the evaluation score for each of the plurality of business items,
   wherein at least one business item corresponding to a score smaller than a reference score is selected from among the first to fifth scores, a reference sentence identical to or similar to the sentence that is extracted from the text in relation to the selected business item is extracted from a reference database (DB), and the recommendation query is automatically generated and output based on a query list corresponding to the reference text,
   wherein the plurality of business items further includes an item for a customer question,
   sixth information for the customer question is extracted and a sixth score for the customer question is calculated based on the sixth information, and
   the sixth information includes information about the number of customer questions, and
   wherein the sixth information includes information about a pending customer question, and
   the method further comprises:
   automatically generating and outputting schedule information for the sales representative based on alarm information for the pending customer question;
   automatically categorizing, by involving the DNN, the customer question based on the plurality of business items;
   calculating an evaluation score for the customer question based on analysis of the categorized customer question; and
   correcting the evaluation score for each of the business items based on the evaluation score for the customer question.

2. The method of claim 1, further comprising calculating a probability of sales success based on the evaluation score for each of the plurality of business items.

3. The method of claim 2, wherein the probability of sales success is calculated based on a distribution indicated by the evaluation score for each of the plurality of business items.

4. The method of claim 3, wherein at least one reference distribution identical to or similar to the distribution indicated by the evaluation score for each of the plurality of business items is extracted from a reference table stored in advance, and the probability of sales success is calculated based on data corresponding to the reference distribution.

5. The method of claim 4, wherein the probability of sales success is calculated based on a deviation between the distribution indicated by the evaluation score and the reference distribution, the number of samples corresponding to the reference distribution, and a success probability value corresponding to the reference distribution.

6. The method of claim 1, further comprising generating a recommendation query for at least one business item based on at least one of analysis information for each of the plurality of business items and the evaluation score for each of the plurality of business items.

7. The method of claim 6, wherein at least one business item with an evaluation score smaller than a reference score is selected from among the plurality of business items, a reference sentence identical to or similar to the sentence that is extracted from the text in relation to the selected business item is extracted from a reference database (DB), and the recommendation query is generated based on a query list corresponding to the reference text.

8. The method of claim 1, wherein at least one business item corresponding to a score smaller than the reference score is selected from among the first to fifth scores, a reference sentence identical to or similar to the sentence that is extracted from the text in relation to the selected business item is extracted from a reference database (DB), and the recommendation query is generated based on a query list corresponding to the reference text.

9. The method of claim 8, wherein the plurality of business items further includes an item for a customer question,
sixth information for the customer question is extracted and a sixth score for the customer question is calculated based on the sixth information, and
the sixth information includes information about the number of customer questions.

10. The method of claim 9, wherein the sixth information includes information about a pending customer question, and
the method further comprises generating schedule information for the sales representative based on alarm information for the pending customer question.

11. The method of claim 9, further comprising:
categorizing the customer question based on the plurality of business items;
calculating an evaluation score for the customer question for each of the business items based on analysis of the categorized customer question; and
correcting the evaluation score for each of the business items based on the evaluation score for the customer question.

12. An apparatus for analyzing a sales conversation based on voice recognition, the apparatus comprising:
a communication interface unit that performs communication with other devices;
a processor; and
a memory that stores at least one instruction executed by the processor, wherein the at least one instruction is performed to obtain voice information about a sales conversation between a sales representative and a customer, convert the voice information into text, extract at least one of a keyword and a sentence corresponding to each of a plurality of business items from the text, extract analysis information for each of the plurality of business items based on at least one of the keyword and the sentence, and calculate an evaluation score for each of the plurality of business items based on the analysis information for each of the plurality of business items,
wherein, through a deep neural network (DNN), the voice information is converted into the text by extracting, using a sales conversation analysis apparatus, a Mel-frequency cepstral coefficient (MFCC) feature vector from voices of the sales representative and the customer, and separating and extracting the voice of the sales representative and the voice of the customer based on the extracted MFCC vector through K-mean clustering,
wherein the plurality of business items includes items about a budget of a customer, an authority of the customer, needs of the customer, a purchase time of the customer, and a competitor of a sales entity,
wherein first information about the budget of the customer, second information about the authority of the customer, third information about the needs of the customer, fourth information about the purchase time of the customer, and fifth information about the competitor of the sales entity are extracted,
wherein a first score for the budget of the customer is calculated based on the first information, a second score for the authority of the customer is calculated based on the second information, a third score for the needs of the customer is calculated based on the third information, a fourth score for the purchase time of the customer is calculated based on the fourth information, and a fifth score for the competitor of the sales entity is calculated based on the fifth information,
wherein the processor executes the at least one instruction to automatically output, by involving the DNN, a recommendation query for at least one business item based on at least one of analysis information for each of the plurality of business items and the evaluation score for each of the plurality of business items,
wherein at least one business item corresponding to a score smaller than a reference score is selected from among the first to fifth scores, a reference sentence identical to or similar to the sentence that is extracted from the text in relation to the selected business item is extracted from a reference database (DB), and the recommendation query is automatically generated and output based on a query list corresponding to the reference text,
wherein the plurality of business items further includes an item for a customer question,
sixth information for the customer question is extracted and a sixth score for the customer question is calculated based on the sixth information, and
the sixth information includes information about the number of customer questions, and
wherein the sixth information includes information about a pending customer question, and
the processor further executes the at least one instruction to:
automatically generate and output schedule information for the sales representative based on alarm information for the pending customer question;
automatically categorize, by involving the DNN, the customer question based on the plurality of business items;
calculate an evaluation score for the customer question based on analysis of the categorized customer question; and
correct the evaluation score for each of the business items based on the evaluation score for the customer question.

13. A non-transitory computer readable recording medium storing a computer program, the computer program executing, in combination with hardware of a computing device, the following processes comprising:
obtaining voice information about a sales conversation between a sales representative and a customer;
converting, by using a deep neural network (DNN), the voice information into text, wherein the converting of the voice information into the text comprises: extracting, using a sales conversation analysis apparatus, a Mel-frequency cepstral coefficient (MFCC) feature vector from voices of the sales representative and the customer, and separating and extracting the voice of the sales representative and the voice of the customer based on the extracted MFCC vector through K-mean clustering;
extracting at least one of a keyword and a sentence corresponding to each of a plurality of business items from the text; extracting analysis information for each of the plurality of business items based on at least one of the keyword and the sentence;

calculating an evaluation score for each of the plurality of business items based on the analysis information for each of the plurality of business items, wherein the plurality of business items includes items about a budget of a customer, an authority of the customer, needs of the customer, a purchase time of the customer, and a competitor of a sales entity, wherein first information about the budget of the customer, second information about the authority of the customer, third information about the needs of the customer, fourth information about the purchase time of the customer, and fifth information about the competitor of the sales entity are extracted, and wherein a first score for the budget of the customer is calculated based on the first information, a second score for the authority of the customer is calculated based on the second information, a third score for the needs of the customer is calculated based on the third information, a fourth score for the purchase time of the customer is calculated based on the fourth information, and a fifth score for the competitor of the sales entity is calculated based on the fifth information;

automatically outputting, by involving the DNN, a recommendation query for at least one business item based on at least one of analysis information for each of the plurality of business items and the evaluation score for each of the plurality of business items, wherein at least one business item corresponding to a score smaller than a reference score is selected from among the first to fifth scores, a reference sentence identical to or similar to the sentence that is extracted from the text in relation to the selected business item is extracted from a reference database (DB), and the recommendation query is automatically generated and output based on a query list corresponding to the reference text, wherein the plurality of business items further includes an item for a customer question, sixth information for the customer question is extracted and a sixth score for the customer question is calculated based on the sixth information, and the sixth information includes information about the number of customer questions, and wherein the sixth information includes information about a pending customer question, and the computer program further executing, in combination with hardware of a computing device, the following processes comprising:

automatically generating and outputting schedule information for the sales representative based on alarm information for the pending customer question;

automatically categorizing, by involving the DNN, the customer question based on the plurality of business items;

calculating an evaluation score for the customer question based on analysis of the categorized customer question; and correcting the evaluation score for each of the business items based on the evaluation score for the customer question.

* * * * *